United States Patent
Matsuoka

(10) Patent No.: US 9,819,594 B2
(45) Date of Patent: Nov. 14, 2017

(54) INFORMATION PROCESSING SYSTEM AND CONTROLLING METHOD AND CONTROLLING DEVICE FOR THE SAME

(71) Applicant: FUJITSU LIMITED, Kawasaki-shi, Kanagawa (JP)

(72) Inventor: Naoki Matsuoka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 186 days.

(21) Appl. No.: 14/643,198

(22) Filed: Mar. 10, 2015

(65) Prior Publication Data

US 2015/0281086 A1 Oct. 1, 2015

(30) Foreign Application Priority Data

Mar. 31, 2014 (JP) .................................. 2014-074426

(51) Int. Cl.
*H04L 12/803* (2013.01)
*H04L 12/741* (2013.01)
*H04L 29/06* (2006.01)

(52) U.S. Cl.
CPC ............ *H04L 47/122* (2013.01); *H04L 45/74* (2013.01); *H04L 69/22* (2013.01)

(58) Field of Classification Search
CPC ......... H04L 12/28; H04L 12/80; H04L 45/74; H04L 47/122; H04L 69/22
See application file for complete search history.

(56) References Cited

U.S. PATENT DOCUMENTS

2006/0059552 A1 3/2006 Aoki et al.
2013/0298237 A1* 11/2013 Smith ................. H04L 63/1441
726/23

(Continued)

FOREIGN PATENT DOCUMENTS

JP 2006-74705 3/2006
JP 2008-109357 5/2008

OTHER PUBLICATIONS tcpipguide; ARP Message Format; Mar. 13, 2014; http://www.tcpipguide.com/free/t_ARPMessageFormat.htm.*

(Continued)

*Primary Examiner* — Noel Beharry
*Assistant Examiner* — Richard Schnell
(74) *Attorney, Agent, or Firm* — Staas & Halsey LLP

(57) ABSTRACT

A system includes a first information processing device that is a transmission destination of a packet, a second information processing device that is configured to relay the packet between a first port and a second port of the second information processing device, a third information processing device that is a transmission source of the packet, and a control device includes a processor configured to execute a process including setting the first information processing device so that a first request packet for resolving an address including first identification information that identifies the first information processing device is not received, making the second information processing device transmit a first confirmation packet including second identification information via the first port, making the third information processing device transmit the first request packet, and making the second information processing device transmit a first response packet for the first request packet via the first port.

7 Claims, 17 Drawing Sheets

(56) References Cited

U.S. PATENT DOCUMENTS

2014/0029437 A1* 1/2014 Kurita ................... H04L 45/125
                                                         370/237
2014/0064148 A1* 3/2014 Jain ........................ H04L 12/28
                                                         370/255
2015/0212909 A1* 7/2015 Sporel ................. G06F 11/2023
                                                         714/4.11

OTHER PUBLICATIONS

Techtarget; Arithmetic-Logic Unit; 2005; http://whatis.techtarget.com/definition/arithmetic-logic-unit-ALU.*

* cited by examiner

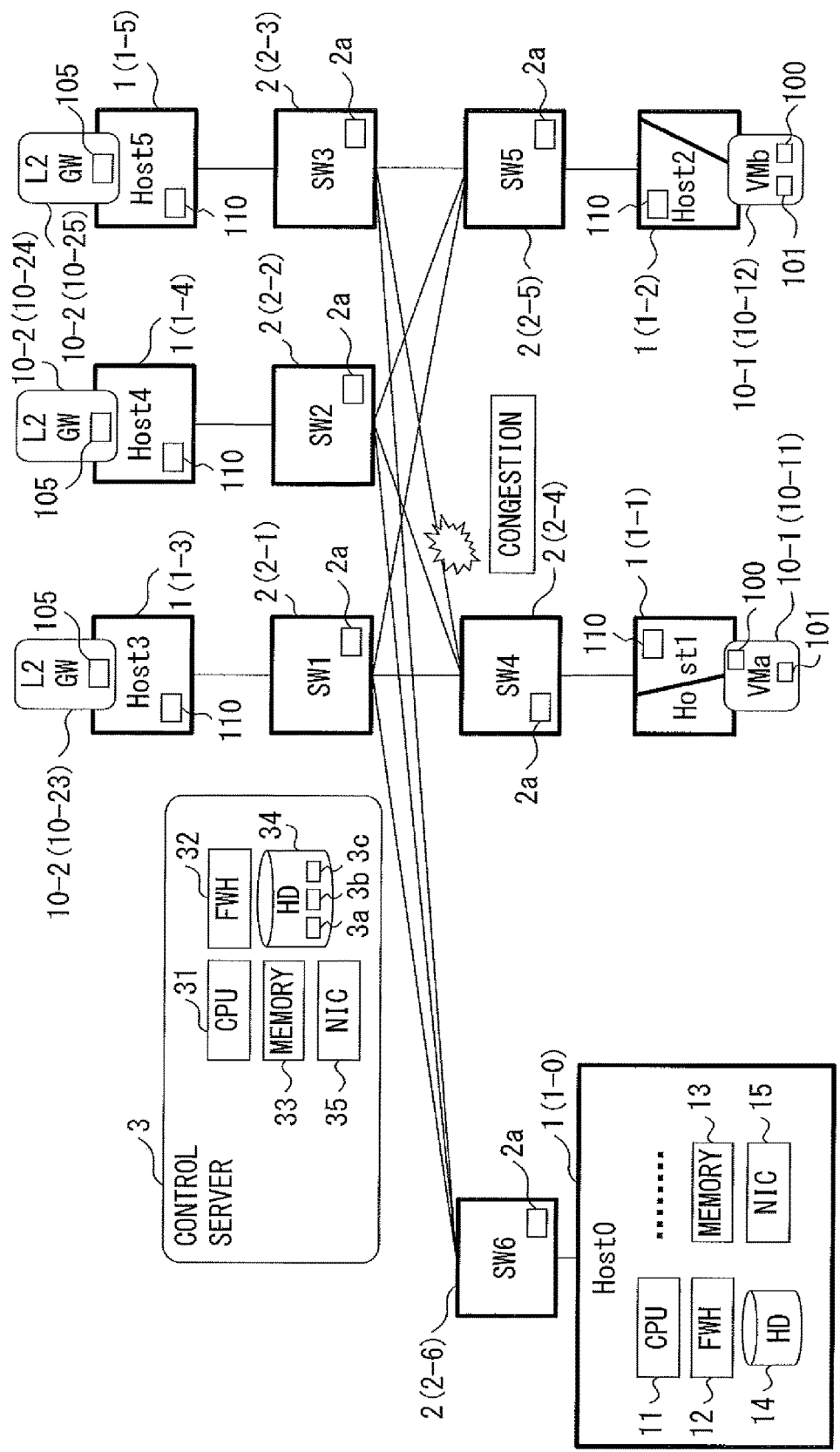
F I G. 1

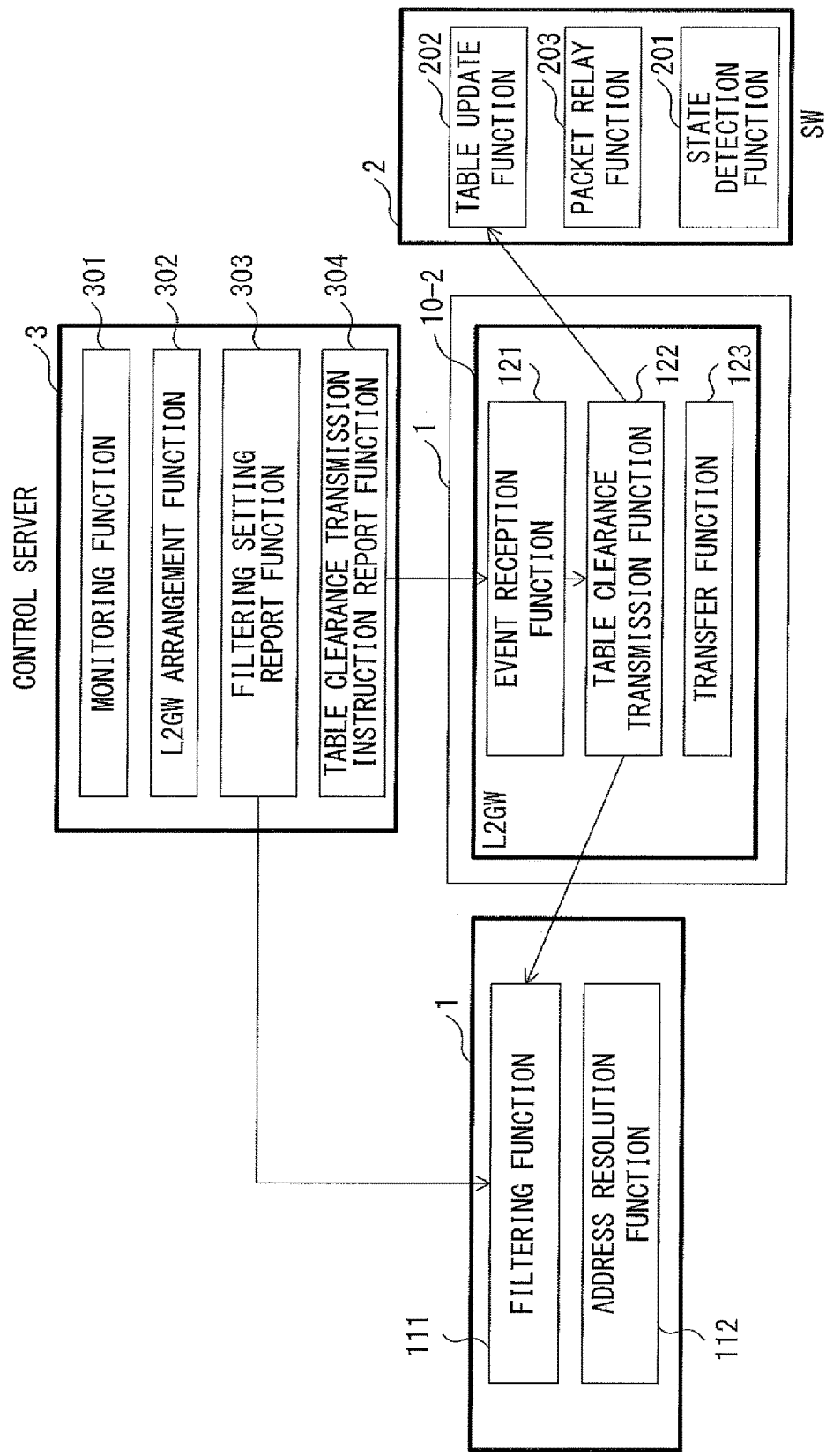
F I G. 4

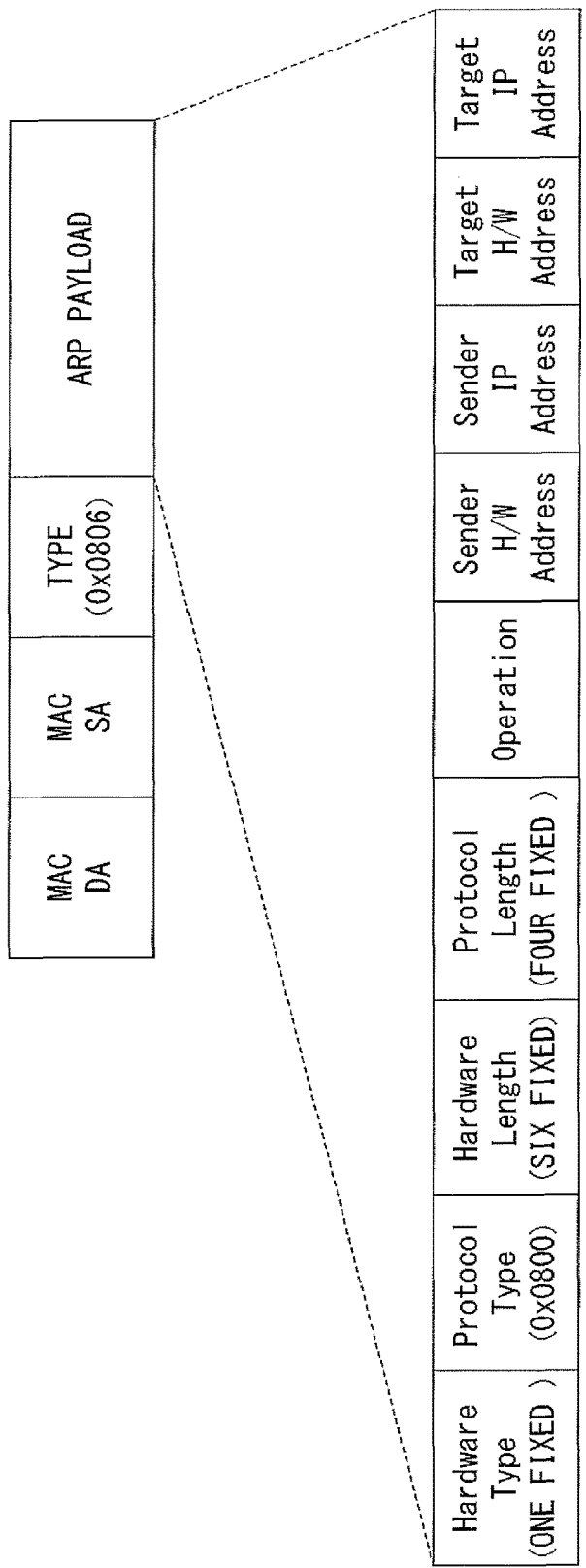
F I G. 5

3a

| VM FLOW | ROUTE (SET OF LINKS) | | | | | |
|---|---|---|---|---|---|---|
| VM1-VM2 | HOST1 | | | | | |
| VM1-VM3 | (HOST1, SW3) | (SW3, HOST2) | | | | |
| VM1-VM4 | (HOST1, SW3) | (SW3, SW0) | (SW0, SW4) | (SW4, HOST3) | | |
| .. | | | | | | |
| VM1-VM8 | (HOST1, SW3) | (SW3, SW0) | (SW0, SW5) | (SW5, HOST6) | | |
| .. | | | | | | |

FIG. 7

| VM | HOST |
|---|---|
| VM1 | HOST1 |
| VM2 | HOST1 |
| VM3 | HOST2 |
| ⋮ | |
| VM8 | HOST6 |

```
POST /filter  HTTP/1.1
Host: host2.com

MAC=aa:bb:cc:dd:ee:20
IP=192.168.100.20
```

FIG. 9

INFORMATION PROCESSING SYSTEM AND CONTROLLING METHOD AND CONTROLLING DEVICE FOR THE SAME

CROSS-REFERENCE TO RELATED APPLICATION

This application is based upon and claims the benefit of priority of the prior Japanese Patent Application No. 2014-074426, filed on Mar. 31, 2014, the entire contents of which are incorporated herein by reference.

FIELD

The embodiments discussed herein are related to an information processing system that includes a plurality of information processing devices, a controlling method for the information processing system and a controlling device used for the information processing system.

BACKGROUND

Today, information processing devices can be connected to a network. Information processing devices connected to a network as nodes are terminal devices, host computers (referred to as "hosts" hereinafter) that provide services, processing capacity or the like to terminal devices or the like, or are devices etc. that perform a process such as information collection etc. Herein, the meaning of "host" includes a server that provides services to terminal devices. Also, the "information processing device" hereinafter refers to an information processing device that serves as a transmission source (transmission side) of a packet or a transmission destination (reception side) of a packet unless otherwise noted. Many of nodes other than information processing devices are network devices such as a hub, a switch, etc. Thus, nodes other than information processing devices will be referred to as "network devices".

There is a trend that an increasing number of information processing devices are connected to a network. Today, it has become common that many information processing devices are connected to one network. There is also a trend that an increasing amount of data is transmitted and received between information processing devices. This also has created a trend that the amount of communication traffic is increasing in a network.

Packets transmitted from respective information processing devices are transferred through routes in accordance with the configuration of the network and the positions of the information processing devices in the network that transmit and receive the packets. Links having a relatively great number of transfer routes tend to be subjected to concentration of communication traffic more than other links, leading to a high possibility of becoming a performance bottle neck of information processing devices.

Such concentration of communication traffic in networks may deteriorate the processing capacity of information processing devices connected to a network. Therefore, it is desirable to prevent concentration of communication traffic in networks from occurring.

Occurrence of concentration of communication traffic in network can be suppressed by controlling transfer routes of packets. As a conventional method for controlling transfer routes, there is, among other methods, a first method in which network devices are managed so as to control transfer routes and a second method in which VLAN (Virtual Local Area Network) technology is used so as to control transfer routes.

A network device refers to the header of a received packet so as to determine a port used for transmitting the received packet. For the determination of a packet port used for transmitting a packet, a packet forwarding table, which holds relationships between MAC (Media Access Control) addresses or IP (Internet Protocol) addresses and ports for transmitting the packets, is usually used. The transfer route of a packet can be changed by changing the contents of the packet forwarding table of the packet via the network management system. However, the controlling of the transfer route of a packet via a network management system is based on an assumption that a network device that can update a packet forwarding table through direct control from an external environment is provided and that a network management system exists that can control an arbitrary network device. However, such an assumption is not true for all networks (facilities such as data centers etc. in which networks are constructed). Construction of a management system and replacement to a network device that can be controlled directly by such a management system results in immense cost. Therefore, the application of the first method involves many undesirable aspects. It can be said that assuming the existence of a network device that can be controlled directly from an external environment is not desirable in view of reducing cost more reliably.

The VLAN technology that logically divides a network into a plurality of broadcast domains (VLANs) is widely used today partially because a very large number of information processing devices have started to be connected to a network.

The dividing into VLANs changes transfer routes of packets. The second method utilizes this phenomenon. In the second method, a VLAN is set in advance for each of a plurality of routes and switching between VLANs to be used is performed so that a link that has actually become a bottleneck is not used. By switching between VLANs to be used, it is possible to avoid packet transfer through a link that has become a bottleneck. However, such avoidance requires setting of many VLANs in advance.

A VLAN-ID (IDentifier) is assigned to each VLAN as identification information. VLAN-IDs that can be assigned are finite resources, and today it is becoming a situation in which there are not a sufficient number of assignable VLAN-IDs because of the scales of networks. Because of this situation, the second method is not always applicable. This means that the degree of limitation of resources is a matter that is to be emphasized.

From the above, it is believed to be desirable to respond to the existence or occurrence of a link for which packet transfer is to be suppressed (or avoided here) due to a reason such as a bottleneck etc., by using resources with lower limitation and without controlling network devices.

Patent Document 1 describes a countermeasure device that can communicate with a plurality of computers, the device including a first and second computers, the countermeasure device including a communication address changing unit that changes the communication address of the second computer recorded in the first computer to the communication address of the countermeasure device and changes the communication address of the first computer recorded in the second computer to the communication address of the countermeasure device, a first packet obtaining unit that obtains a packet transmitted from the first computer to the second computer, a second packet obtaining unit that obtains a packet transmitted from the second computer to the first computer and a first determination unit that determines whether or not to transmit the packet obtained by the first packet obtaining unit to the second computer, and thereby limits communication services conducted by the first and second computers.

Patent Document 2 describes a packet transfer device including an address storage unit that stores the IP address and MAC address of the device and IP addresses of a plurality of monitoring target terminal devices, a proxy ARP process unit that transmits and receives ARP request messages and ARP response messages with respect to the plurality of terminal devices by using the IP addresses of the plurality of terminal devices stored in the address storage unit so as to rewrite an ARP table that describes pairs of IP addresses and MAC addresses stored in the plurality of terminal devices, a packet reception unit that receives a packet transmitted from one of the plurality of terminal devices, a filtering unit that analyzes a packet received by the packet reception unit and performs a prescribed filtering process on a packet when a prescribed condition is met and a packet transfer unit that transfers a packet processed by the filtering unit to a different terminal device.

Patent Document 1: Japanese Laid-open Patent Publication No. 2006-74705

Patent Document 2: Japanese Laid-open Patent Publication No. 2008-109357

SUMMARY

According to an aspect of the embodiments, an information processing system includes a first information processing device that is a transmission destination of a packet, a second information processing device that includes a first port and a second port and that is configured to relay the packet between the first port and the second port, a third information processing device that is a transmission source of the packet, and a control device that is configured to control the first information processing device, the second information processing device and the third information processing device and that includes a processor configured to execute a process including setting the first information processing device so that a first request packet for resolving an address including first identification information that identifies the first information processing device is not received, making the second information processing device transmit a first confirmation packet including second identification information via the first port, making the third information processing device transmit the first request packet, and making the second information processing device transmit a first response packet for the first request packet via the first port.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration example of an information processing system according to the present embodiment;

FIG. 4 illustrates a functional configuration example of the control server, a host and a L2GW generated in a host, and a switch;

FIG. 5 illustrates a configuration example of a GARP packet;

FIG. 7 illustrates a configuration example of a route table for each VM flow;

FIG. 8 illustrates a configuration example of a VM operation host table;

FIG. 9 illustrates a message example transmitted for filtering setting of an ARP packet;

DESCRIPTION OF EMBODIMENTS

Figure 2:
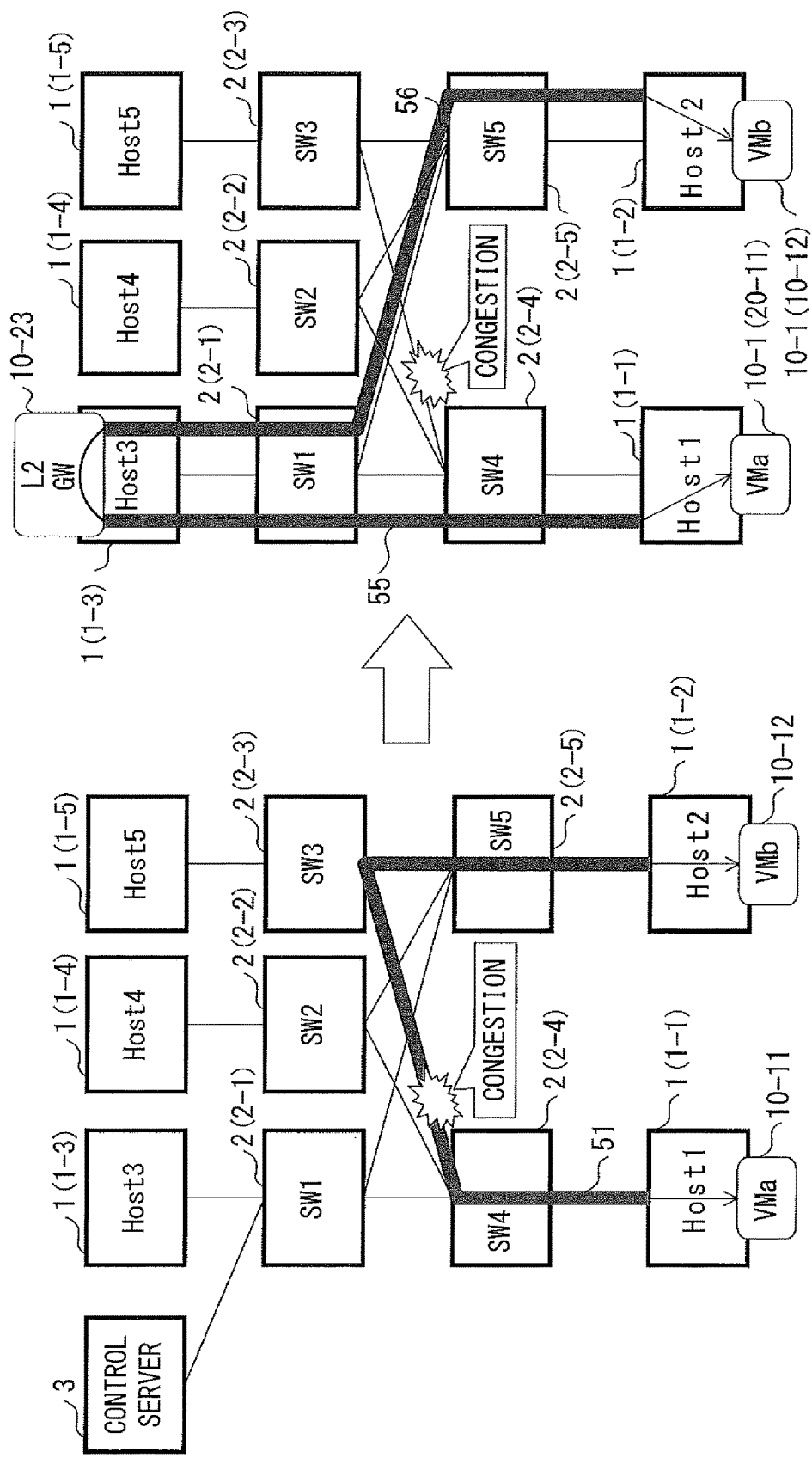
FIG. 2 illustrates an example of controlling of switching between transfer routes of a packet performed by a control server.

Hereinafter, detailed explanations will be given for the embodiments of the present invention by referring to the drawings.

FIG. 1 illustrates a configuration example of an information processing system according to the present embodiment. An information processing system according to the present embodiment is a system constructed in for example a data center. For convenience of explanations, portions of an information processing system are partially extracted and illustrated in FIG. 1.

All the host computers (referred to as "hosts" hereinafter) 1 (1-0 through 1-5) denoted by "Host0" through "Host5" in FIG. 1 are information processing devices according to the present embodiment. The host 1, which is an information processing device according to the present embodiment, is only illustrated as an information processing device that serves as a transmission source or a transmission destination of a packet in FIG. 1. As illustrated in FIG. 1, each host 1 includes a plurality of CPUs (Central Processing Unit) 11, an FWH (Firm-Ware Hub) 12, a memory 13, a hard disk device (HD) 14 and at least one NIC (Network Interface Card) 15 (15-1, 15-2).

In each host 1, a VM (Virtual Machine) is generated. "VMa", "VMb" and "L2GW" appearing in FIG. 1 are VMs generated in the hosts 1. "VMa" and "VMb" are VMs generated for providing services, processing capacity or the like, and "L2GW" is a VM generated for controlling transfer routes of packets. Because of this difference in usage, "VMa" and "VMb" are given numerals 10-1 (10-11, 10-12)

and "L2GW" is given a numeral 10-2 (10-23 through 10-25). Hereinafter, "VMa" and "VMb", and the like generated in the respective hosts 1 are described as "VMn" when the hosts in which they are generated do not have to be discriminated. Also, the VMs that do not have to be discriminated on the basis of the hosts 1 in which they are generated or on the basis of the usage are given a numeral 10.

In this example, it is assumed that the virtualized environment in which the VM 10 operates is provided by a hypervisor in the hard disk device 14. A guest OS (Operating System) 101 and an application program (referred to as an "application" hereinafter) that operate in each of the VMs 10 are stored in for example the hard disk device 14. In the case of host-OS type virtualized environment, a host OS 110 is also stored in the hard disk device 14.

In the VMs 10 generated in the respective hosts 1, virtual NICs are constructed, and MAC addresses are assigned to constructed virtual NICs. Accordingly, communications, i.e., transmission and reception of packets between the hosts 1 are conducted in units of the VMs 10.

"SW1" through "SW6" appearing in FIG. 1 denote network devices 2 (2-1 through 2-6). The types of the network devices 2 are not limited particularly. However, it is assumed in this example that each of the network devices 2 refers to a table (referred to as a "forwarding table" hereinafter) 2a representing relationships between MAC addresses and ports for transmitting packets and selects the port for transmitting a received packet. Each entry (record) of the forwarding table 2a additionally stores the VLAN-ID representing the VLAN to which the forwarding table 2a belongs. Hereinafter, the network devices 2 will be referred to as "switches".

In the information processing system, a control server 3 is installed for the purpose of management. This control server 3 is a control device according to the present embodiment, and includes at least one CPU 31, an FWH 32, a memory 33, a hard disk device 34 and at least one NIC 35, as illustrated in FIG. 1.

Control targets of the control server 3 include at least the hosts 1. For example, in the hard disk device 34, the control program 3c for managing the information processing system is stored. The control program 3c is executed by the CPU 31, and thereby the control server 3 manages the information processing system. In this example, it is assumed that the control server 3 is connected to a switch 2-1, as represented in FIG. 2. Communication between the control server 3 and the respective hosts 1 may be conducted without using the switches 2.

FIG. 2 illustrates an example of controlling of switching between transfer routes of a packet performed by the control server. In FIG. 2 illustrates an example of controlling of switching of transfer routes of a packet transmitted and received between the hosts 1-1 and 1-2, the controlling being executed when congestion occurred in a link connecting the switches 2-4 and 2-3.

FIG. 2 illustrates two network configuration diagrams that depict only extracted nodes related to the switching of packet transfer routes. In the left network configuration diagram in FIG. 2, a transfer route 51 of packets before the occurrence of congestion is represented by the solid line. Packets transmitted and received between the hosts 1-1 and 1-2 through the transfer route 51 are transferred via the switches 2-4, 2-3 and 2-5.

When congestion has occurred in a link connecting the switches 2-4 and 2-3, packets transmitted and received between the hosts 1-1 and 1-2 have to be transferred by bypassing the congested link. Thus, according to the present embodiment, as illustrated in the right network configuration diagram in FIG. 2, packets are transferred between the hosts 1-1 and 1-2 via for example the host 1-3. In order to realize such packet transfer, the present embodiment sets a transfer route 55 of packets between the hosts 1-1 and 1-3 and a transfer route 56 of packets between the hosts 1-2 and 1-3. The L2GW 10-2 (10-23) generated in the host 1-3 relays (transfers) packets between the transfer route 55 and the transfer route 56. Reception of packets through the transfer route 55, transmission of packets to the transfer route 55, reception of packets through the transfer route 56 and transmission of packets to the transfer route 55 are conducted by using different NICs 15.

By setting the two transfer routes 55 and 56 as illustrated in FIG. 2, packets are transferred between the hosts 1-1 and 1-2 without using the congested link. This maintains more advantageous communication environments so as to suppress deterioration of the quality of service etc. provided by the hosts 1-1 and 1-2 even when congested link has occurred.

The present embodiment uses tunneling technology to set the two transfer routes 55 and 56. Tunneling technology is technology that establishes a tunnel, which is a virtual and closed communication channel connecting two points in a network.

Figure 3:
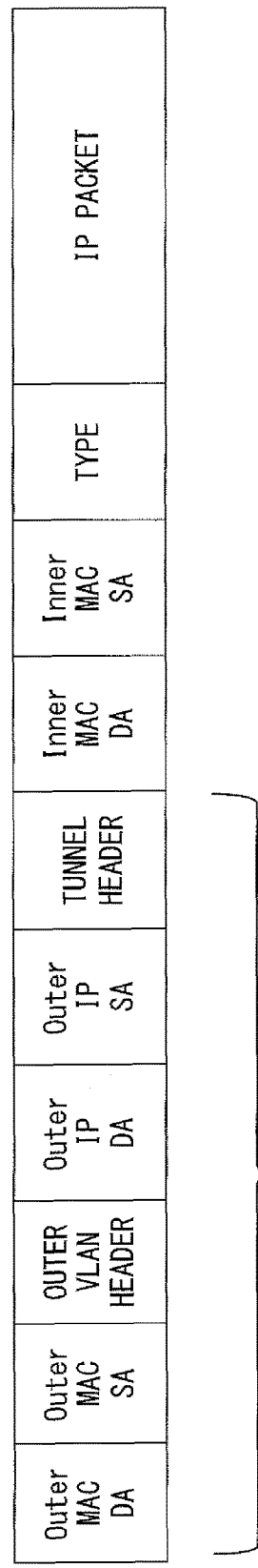
FIG. 3 illustrates a configuration example of a packet transmitted using a tunnel.

FIG. 3 illustrates a configuration example of a packet transmitted using a tunnel.

Packets for tunnel communication (referred to as "tunneling packets" hereinafter) are generated by encapsulating packets described by using a protocol that is used in the inherent communication (referred to as "general packets" hereinafter). Tunneling protocol information 40 illustrated in FIG. 3 is information added to a general packet for encapsulation. In the example illustrated in FIG. 3, the tunneling protocol information 40 includes a transmission destination MAC address (described as "Outer MAC DA" in FIG. 3), a transmission source MAC address (described as "Outer MAC SA" in FIG. 3), a VLAN-ID, a transmission destination IP address (described as "Outer IP DA" in FIG. 3), a transmission source IP address (described as "Outer IP SA" in FIG. 3) and a tunnel ID.

A general packet includes, as illustrated in FIG. 3, for example a transmission destination MAC address (described as "Inner MAC DA" in FIG. 3), a transmission source MAC address (described as "Inner MAC SA" in FIG. 3), type data (described as "TYPE" in FIG. 3), and an IP packet. Type data stored in the type field is data representing the type of the protocol, and is IP in the example illustrated in FIG. 3.

Twelve bits are assigned to the field for storing a VLAN-ID, which is an identifier of a VLAN, and twenty four bits are assigned to the field for storing a tunnel ID. Accordingly, the setting of tunnels imposes much lower limitation on IDs, which are resources, than the setting of VLANs, allowing setting of a very large number of tunnels. Many networks are compatible with setting of tunnels, and none of the switches 2 requires direct control for setting of tunnels. Thus, packet transfer that bypasses a congested link between the hosts 1-1 and 1-2 can be realized without controlling any of the switches 2 directly and by using resources with lower limitation than VLAN-IDs.

The setting for switching transfer routes such as the transfer routes 55 and 56 may be conducted for reasons other than the occurrence of a congested link. For example, the setting for switching of transfer routes may be triggered by the occurrence of a failure in any of the switches 2 or any of the links. Alternatively, the setting for switching of transfer routes may be triggered by the finding of a link that can become a bottleneck in a set VLAN. Thus, triggers for switching transfer routes are not limited particularly. However, in this example, only the occurrence of a congested link is assumed as a trigger for convenience of explanations.

FIG. 4 illustrates a functional configuration example of the control server, the hosts and the L2GW generated in a host, and the switch. Next, by referring to FIG. 4, detailed explanations will be given for the functions of the control server 3, the hosts 1, the L2GW 10-2 generated in the host 1, and the switch 2 that permits the switching control of transfer routes as illustrated in FIG. 2.

The switching of transfer routes as illustrated in FIG. 2 is implemented by creating a situation where packet transfer between two hosts 1 uses different host 1 between the two hosts 1. Thereby, in the example illustrated in FIG. 2, the transfer route 51 connecting the hosts 1-1 and 1-2 is divided into two portions, i.e., the transfer route 55 connecting the hosts 1-1 and 1-3 and the transfer route 56 connecting the hosts 1-3 and 1-2. FIG. 4 illustrates functions that are particularly related to such switching of transfer routes.

The switch 2 includes a state detection function 201, a table update function 202 and a packet relay function 203.

The state detection function 201 conducts detection of a port to which a link is connected, diagnosis of a communication state that is via the connected link, and other processes. The diagnosis of whether or not congestion has occurred is made by this state detection function 201, and when a diagnosis that congestion has occurred has been made, the state detection function 201 reports that fact to the control server 3. Diagnosis of whether or not congestion has occurred is made by for example measuring a period of time between transmission of a prescribed packet and reception of a response.

As described above, each switch 2 refers to the forwarding table 2a, which represents relationships between MAC addresses and ports for transmitting packets, and selects a port for transmitting a received packet. The table update function 202 updates the forwarding table 2a by adding an entry on the basis of learning based on a received packet, deleting an entry that is to be deleted, etc.

Packets that are transmitted or received include ARP (Address Resolution Protocol) packets and GARP (Gratuitous ARP) packets. In the present embodiment, it is assumed that an ARP packet and a GARP packet are used for the switching of transfer routes as illustrated in FIG. 2.

An ARP packet is a packet that is broadcast for address resolution request, which confirms MAC addresses from IP addresses. The host 1 to which the IP address stored in an ARP packet has been assigned transmits a response packet that has stored the MAC address of the host 1 in response to the reception of that ARP packet. Thereby, each host 1 can transmit an ARP packet storing an IP address so as to conduct address resolution confirming the MAC address of the host 1 to which that IP address has been assigned.

The host 1 that has transmitted or received an ARP packet stores information obtained by the transmission or reception of the ARP packet in a table (ARP table) 100. An entry in the ARP table 100 stores at least for example an IP address and a MAC address. In this example, it is assumed that each entry also stores interface information representing the NIC 15 that has received an ARP packet or an ARP response packet.

A GARP packet is an ARP packet that is broadcast for confirming whether or not the same address has been assigned to other hosts 1.

FIG. 5 illustrates a configuration example of a GARP packet. This GARP packet is a packet transmitted by non-tunnel communication. Accordingly, the fundamental configuration is similar to that of a general packet that is not encapsulated, and includes, as illustrated in FIG. 5, a transmission destination MAC address (described as "MAC DA" in FIG. 5), a transmission source MAC address (described as "MAC SA" in FIG. 5), a type data (described as "TYPE" in FIG. 5) and an ARP packet (described as "ARP PAYLOAD" in FIG. 5). Type data stored in a type field is data representing the type of the protocol, and "0x0806" appearing in FIG. 5 is a value representing an ARP.

An ARP packet includes a hardware type, a protocol type, a hardware address length (described as "Hardware Length" in FIG. 5), a protocol address length (described as "Protocol Length" in FIG. 5), an operation, a transmission source MAC address (described as "Sender H/W Address" in FIG. 5), a transmission source IP address (described as "Sender IP address" in FIG. 5), a search target MAC address (described as "Target H/W address" in FIG. 5) and a search target IP address (described as "Target IP address" in FIG. 5).

A hardware type is information representing the type of hardware, and "1" appearing in FIG. 5 is the value representing Ethernet.

A protocol type is information representing the type of the protocol, and "0x0800" appearing in FIG. 5 represents IP.

A hardware address length is information representing the data length of the MAC address, and the value thereof is "6", which is a fixed value.

A protocol address length is information representing the address length (IP address length in this example) of the protocol specified by the protocol type, and the value thereof is "4", which is a fixed value.

An operation is information representing the type of the operation of the ARP and whether or not it is a request.

A transmission source MAC address and a transmission source IP address are a MAC address and an IP address that have been assigned to the host 1 that transmits a GARP packet. A search target MAC address and a search target IP address specify the host 1 that is to respond to a GARP packet. In a GARP packet, a search target MAC address and a search target IP address are a MAC address and an IP address that have been assigned to the host 1 that transmit the GARP packet.

The host 1 that has received a GARP packet having the above confirmation confirms the search target MAC address and the search target IP address stored in the ARP packet, and deletes an entry that is to be deleted. As a result of this, when a GARP packet has been transmitted, the ARP table 100 is updated in one of the hosts 1.

When the host 1 has received a GARP packet having, as the search target MAC address, a MAC address stored in one of the ARP tables 100, the host 1 deletes the entry storing that MAC address. Because of this, the host 1 transmits an ARP packet before conducting communication with different hosts 1 whose MAC addresses were stored in the deleted entry.

Similarly to the host 1, the switch 2 also deletes an entry storing a MAC address specified by a received GARP packet from the forwarding table 2a in response to reception of the GARP packet. Such deletion of an entry from the forwarding table 2a is realized by the table update function 202.

Each host 1 includes a filtering function 111 and an address resolution function 112. These functions are implemented by for example the host OS 110.

The address resolution function 112 performs address resolution, which confirms MAC addresses from IP addresses, by generating and transmitting an ARP packet. The ARP table 100 is updated by this address resolution function 112.

Transmission of the above GARP packet is performed for switching transfer routes. In the example illustrated in FIG. 2, transmission of a GARP packet prevents direct packet transfer between the VMa 10-11 in the host 1-1 and the VMb 10-12 in the host 1-2.

The host 1 that deleted an entry in the ARP table 100 in response to a GARP packet becomes unable to conduct communication with other hosts 1 whose MAC addresses were stored in the deleted entry. Because of this, the host 1 that deleted the entry transmits an ARP packet before conducting communication with other hosts 1 whose MAC addresses were stored in the deleted entry. However, when other hosts 1 responded to the ARP packet transmitted by the host 1, the host 1 that transmitted the ARP packet again registers the deleted entry in the ARP table 100. Because of this, in the present embodiment, each host 1 discards an ARP packet that is to be discarded. The filtering function 111 performs filtering for discarding ARP packets to be discarded. Deletion of an entry from the ARP table 100 in response to reception of a GARP packet is also conducted by this filtering function 111.

The control server 3 includes a monitoring function 301, an L2GW arrangement function 302, a filtering setting report function 303 and a table clearance transmission instruction report function 304. These functions 301 through 304 are implemented by the control program 3c.

The monitoring function 301 is a function for monitoring each node. When congestion in a link has been detected by the state detection function 201, each switch 2 reports that fact to the control server 3. This report is processed by the monitoring function 301 and is recognized.

When congestion in a link has been reported from the monitoring function 301, the L2GW arrangement function 302 selects the host 1 that relays transferred packets, i.e., the host 1 in which the L2GW 10-2 is to be arranged, in accordance with the link in which the congestion occurred.

When the L2GW 10-2 has not been activated for the selected host 1, the L2GW arrangement function 302 instructs the selected host 1 to activate the L2GW 10-2. Hereinafter, the host 1 that relays transferred packets by using the generated L2GW 10-2 is referred to as a "relay host".

Figure 6:
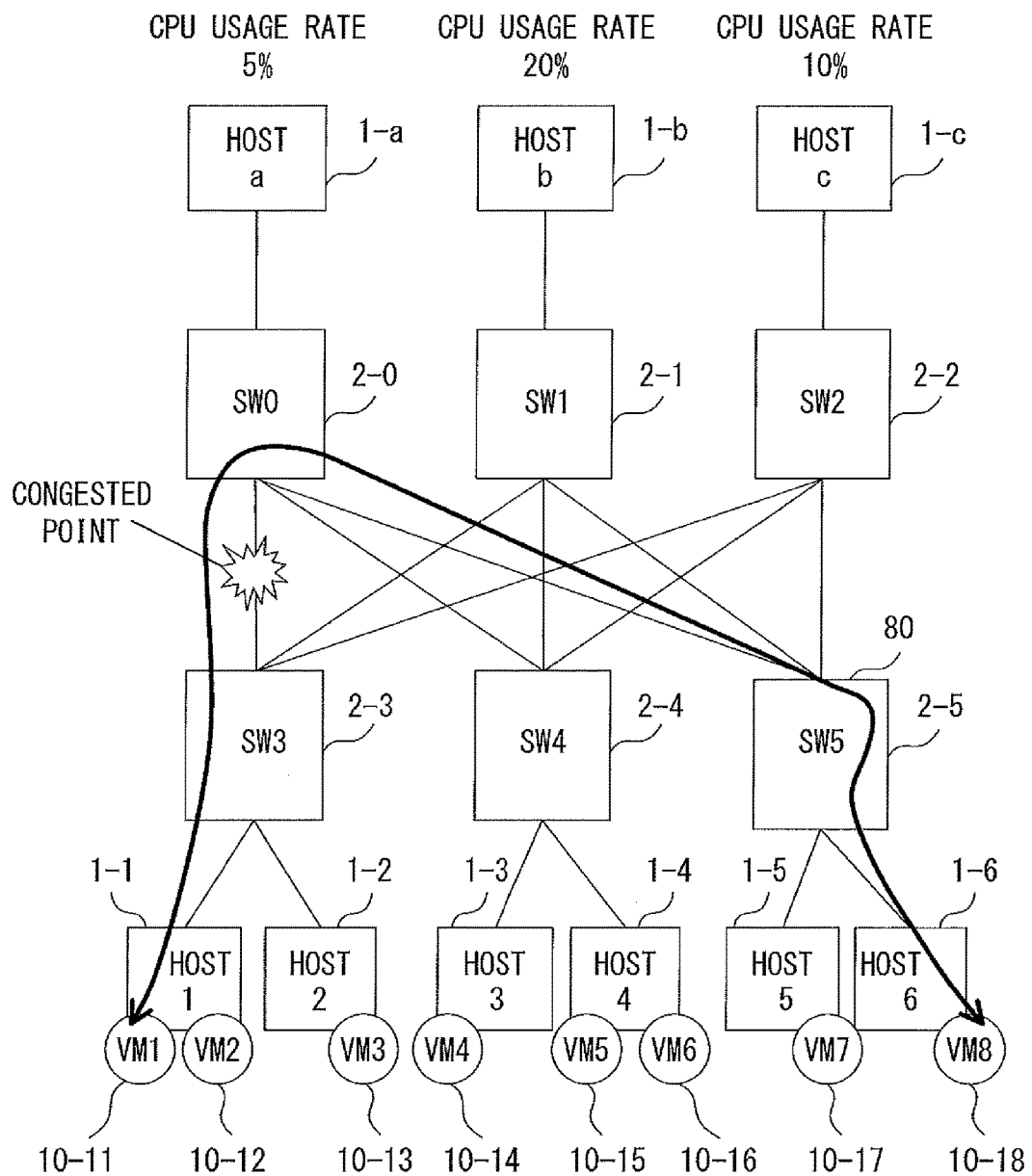
FIG. 6 illustrates an example of a method of selecting a host in which an L2GW is arranged.

FIG. 6 illustrates an example of a method of selecting a host in which an L2GW is arranged. In this example, an information processing system including the six switches 2 (2-0 through 2-5) and nine hosts 1 (1-1 through 1-c) is assumed as illustrated in FIG. 6.

In the information processing system, two VMs 10-11 and 10-12 are generated in the host 1-1. The VM 10-13 and the VM 10-14 are generated in the host 1-2 and the host 1-3, respectively. Two VMs 10-15 and 10-16 are generated in the host 1-4, and VMs 10-17 and 10-18 are generated in the host 1-5 and the host 1-6, respectively. The host 1-1 and the host 1-2 are connected to the host 1-3. Similarly, the host 1-3 and the host 1-4 are connected to the switch 2-4, and the host 1-5 and the host 1-6 are connected to the switch 2-5. The hosts 1-a and 1-b are connected to the switches 2-0 and 2-1, respectively while the host 1-c is connected to the switch 2-2.

FIG. 6 illustrates an example of a case when the link connecting the switches 2-0 and 2-3 has become a congested point. The packet transfer route 80 between the hosts 1-1 and 1-6 includes the switches 2-3, 2-0 and 2-5. Accordingly, the three hosts 1-a through 1-c become candidates for the relay hosts 1 so that packets can be transferred without using the link that has become the congested point.

The control server 3 manages/stores a transfer route table 3a and a VM operation host table 3b for each VM flow. These tables 3a and 3b are tables used for selecting the relay hosts 1. The L2GW arrangement function 302 refers to these tables 3a and 3b so as to select the relay hosts 1.

FIG. 7 illustrates a configuration example of a route table for each VM flow. FIG. 8 illustrates a configuration example of a VM operating host table.

The route table 3a for each VM flow is a table representing a set (combination) of links through which packets are transferred between the VMns 10-1 for each connection between VMns 10-1 that may conduct communication. In FIG. 7, a pair of parentheses represents one link. For example, "(host 1, SW3)" represents a link connecting the host 1-1 and the switch 2-3.

Each of the VMs 10 operates as one information processing device (computer). Accordingly, it is necessary to uniquely identify each of the VMs 10. For this purpose, a virtual NIC is constructed in each VM 10, and a MAC address is assigned to a constructed virtual NIC. Thus, in the route table 3a for each VM flow, a set of links through which packets are transferred is illustrated for each connection between the VMns 10-1.

The VM operation host table 3b is a table representing, for each VMn 10-1, the host 1 in which that VMn 10-1 operates.

The L2GW arrangement function 302 refers to the route table 3a for each VM flow by using information on a congested point (link) reported from the monitoring function 301, and extracts an entry including that congested point. Next, the L2GW arrangement function 302 identifies, for each the extracted entry, two VMns 10-1 to which packets are transferred by using that congested point. The L2GW arrangement function 302 refers to the VM operation host table 3b by using the identified VMns 10-1, and recognizes the host 1 in which the identified VMns 10-1 operate.

Candidates for the relay hosts 1 are the hosts 1 that are different from the recognized host 1 and that meet the relaying condition that packets transferred with respect to the recognized host 1 do not pass through the congested point. Accordingly, the L2GW arrangement function 302 refers to the route table 3a and the VM operation host table 3b for each VM flow so as to extract the host 1 that meets the relaying condition. In the example illustrated in FIG. 6, the three hosts 1-a through 1-c are extracted as the hosts 1 that meet the relaying condition.

By extracting the hosts 1 that meet the above relaying condition, it is possible to appropriately respond to the occurrence of congested points and to perform packet transfer without using the congested point that has occurred.

According to the present embodiment, the host 1 having the lowest CPU loads is selected as the relay host 1 from among candidates for the relay hosts 1. The purpose of this is to minimize the influence caused by operating the L2GW 10-2. Accordingly, when the CPU usage rates of the hosts 1-a through 1-c are 5%, 20% and 10%, respectively, the host 1-a is selected as the relay host 1.

The CPU usage rates of the respective hosts 1 are measured by for example the hypervisor and are reported to the control server 3 at prescribed timing. Those reports are processed by the monitoring function 301.

The filtering setting report function 303 is a function for causing each host 1 to which packets are transferred via a congested point to perform setting of discarding ARP packets that are to be discarded. For this setting, the filtering setting report function 303 reports IP addresses. In the example illustrated in FIG. 2, the IP address of the host 1-2 and the IP address of the host 1-1 are transmitted as reported IP addresses to the host 1-1 and the host 1-2, respectively. The filtering function 111 included in the hosts 1 performs filtering of ARP packets by using IP addresses reported from the control server 3.

FIG. 9 illustrates a message example transmitted for filtering setting of an ARP packet. FIG. 9 illustrates an example using HTTP (Hyper Text Transfer Protocol), and assumes that it is addressed to the host 1-1.

"/filter" appearing as the POST method requires setting of filtering. "host2.com" appearing in the Host request header field represents the URL (Uniform Resource Locator) of the host 1-2. "aa:bb:cc:dd:ee:20" and "192,168,100,20" appearing in the MAC field represent the MAC address and the IP address of the host 1-2, respectively.

In a message addressed to the host 1-2, data of the host 1-1 is stored in the Host request header field, the MAC field and the IP field. A message as illustrated in FIG. (referred to as a "filtering setting request message" hereinafter) is transmitted from the control server 3 to the hosts 1-1 and 1-2. As a result of this, the hosts 1-1 and 1-2 perform filtering of ARP packets.

Also, by the L2GW 10-2 returning an ARP response packet instead of the hosts 1-1 and 1-2, the L2GW 10-23 can be recognized securely as a communication partner that is in place of the hosts 1-1 and 1-2.

The table clearance transmission instruction report function 304 causes, by means of the L2GW arrangement function 302, the L2GW 10-2 operating in the relay host 1 to transmit a GARP packet.

Figure 10:
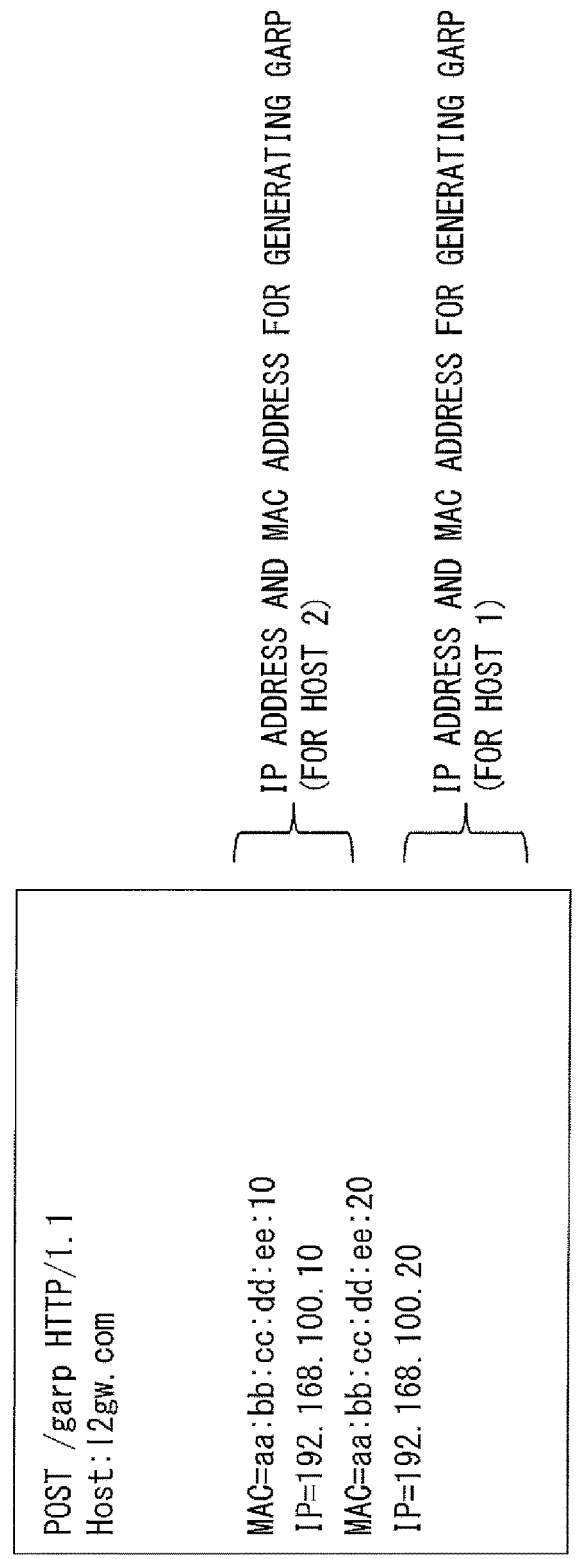
FIG. 10 illustrates a message example for transmission of a GARP packet.

FIG. 10 illustrates a message example for transmission of a GARP packet. The example illustrated in FIG. 10 is also an example that uses HTTP, and the destination of a message (transmission destination) is the L2GW 10-2 in the relay host 1.

"/garp" appearing as the POST method requests transmission of a GARP packet. "12gw.com" appearing in the Host request header field represents the URL of an L2GW 102 in the relay host 1.

"aa:bb:cc:dd:ee:20" appearing in one of the two MAC fields and "192,168,100,20" appearing in one of the two IP fields represent the MAC address and the IP address of the host 1-2, respectively. "aa:bb:cc:dd:ee:10" and "192, 168, 100, 10" appearing respectively in the others of the two MAC fields and the two IP fields represent the MAC address and the IP address of the host 1-1, respectively. These two pairs of MAC addresses and IP addresses are stored as search target MAC addresses and search target IP addresses of separate GARP packets. Thereby, the table clearance transmission instruction report function 304 transmits a message as illustrated in FIG. 10 (referred to as a "GARP transmission request message" hereinafter) addressed to the L2GW 10-2 in the relay host 1 and thereby can make that L2GW 10-2 transmit two types of GARP packets.

The L2GW 10-2 generated in the host 1 includes an event reception function 121, a table clearance transmission function 122 and a transfer function 123. These functions 121 through 123 are implemented by an application 105 (referred to as a "transfer application" hereinafter) for transferring packets that are implemented in for example the L2GW 10-2.

The event reception function 121 is a function that receives a message transmitted, from the control server 3, for controlling transfer routes. Received messages include the above GARP transmission request messages.

When a GARP transmission request message is received by the event reception function 121, the table clearance transmission function 122 transmits a GARP packet the transmission of which is requested by the received GARP transmission request message.

A GARP transmission request message specifies an ARP packet to which a response is to be transmitted from among received ARP packets. When the table clearance transmission function 122 has received an ARP packet having the search target IP address identical to any of IP addresses in a GARP transmission request message, the table clearance transmission function 122 makes a response. The MAC address reported as a response is the MAC address assigned to the L2GW 10-2 itself. By making this response, the host 1-1 recognizes the L2GW 10-2 as a communication partner instead of the host 1-2. As a result of this, the transfer routes 55 and 56 illustrated in FIG. 2 are realized.

The transfer function 123 relays packet transfer between the VMns 10-1 in the two hosts 1 having MAC addresses stored as search target MAC addresses in two types of GARP packets. A packet to be relayed is a tunneling packet. In the tunneling protocol information 40 of a tunneling packet to be relayed, the transmission destination MAC address is the MAC address of the relay host 1 and the transmission source MAC address is the MAC address of one of the VMns 10-1 in the two hosts 1. In a general packet in a tunneling packet to be relayed, the transmission destination MAC address is a MAC address assigned to the L2GW 10-2.

In order to transfer such a packet, the transfer function 123 changes the tunneling protocol information 40, the transmission source MAC address and transmission destination MAC address of a general packet. Specifically, the transfer function 123 changes the transmission destination MAC address and transmission source MAC address to the MAC address of the other of the two hosts 1 and the MAC address of the L2GW 10-2 of the transfer function 123, respectively. Thereby, in the example illustrated in FIG. 2, the transfer function 123 transfers a packet in the transfer route 55 to the transfer route 56 or transfers a packet in the transfer route 56 to the transfer route 55.

Figure 11:
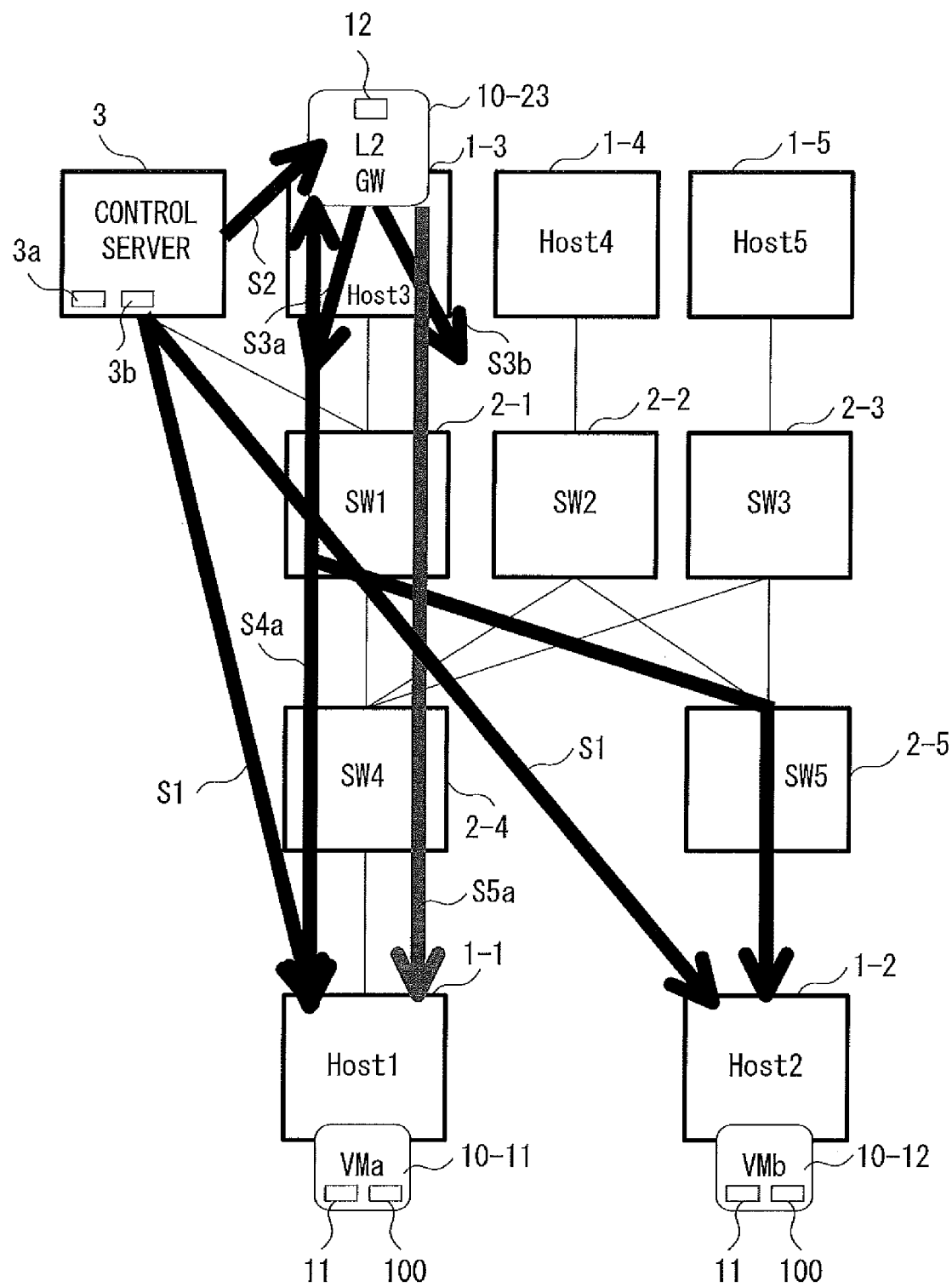
FIG. 11 illustrates operation examples of the control server, the hosts and the switches in a case where transfer routes of packets are switched.
Figure 12A:
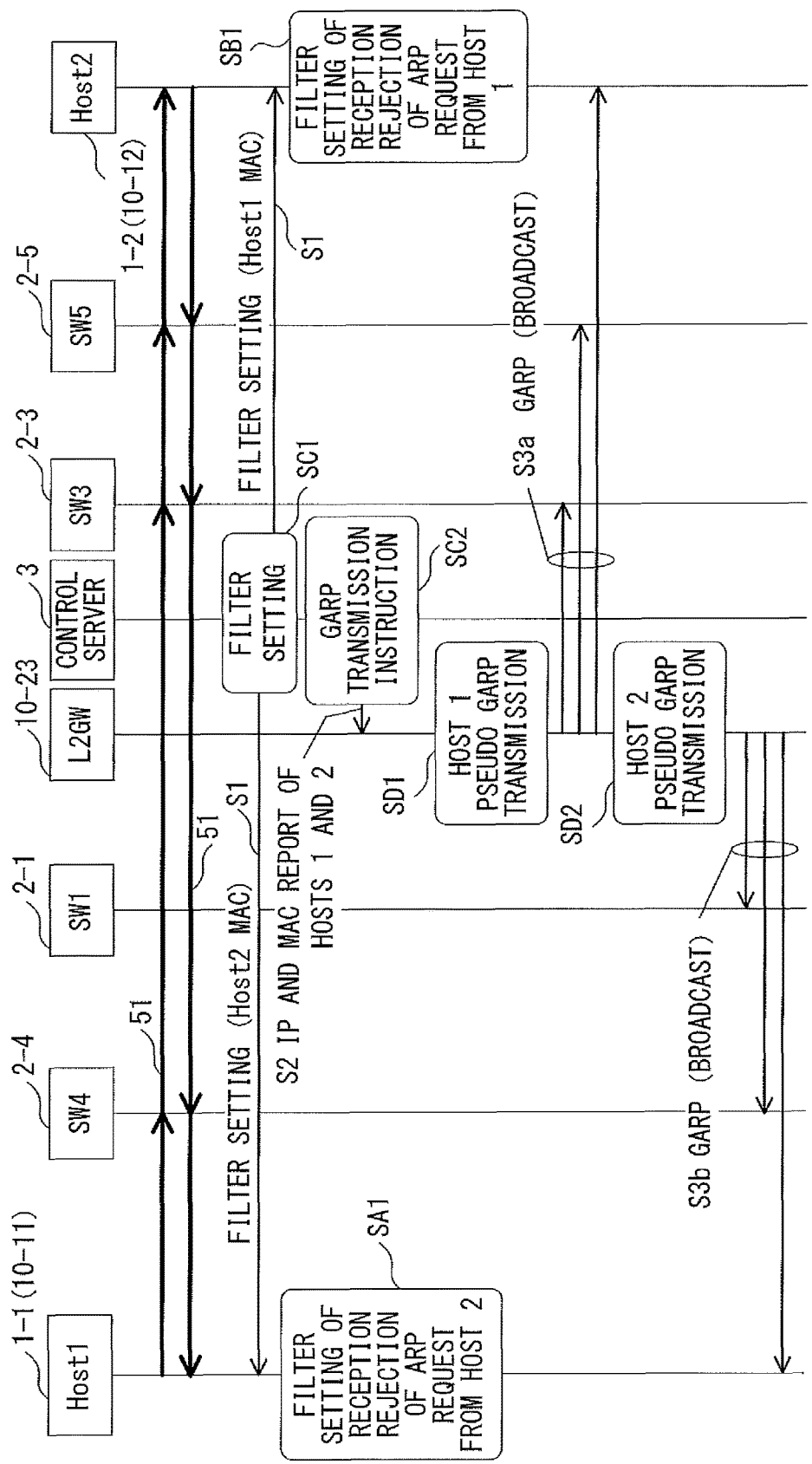
FIGS. 12A and 12B are a sequence diagram illustrating operation examples of the control server, the hosts and the switches in a case where transfer routes of packets are switched.
Figure 12B:
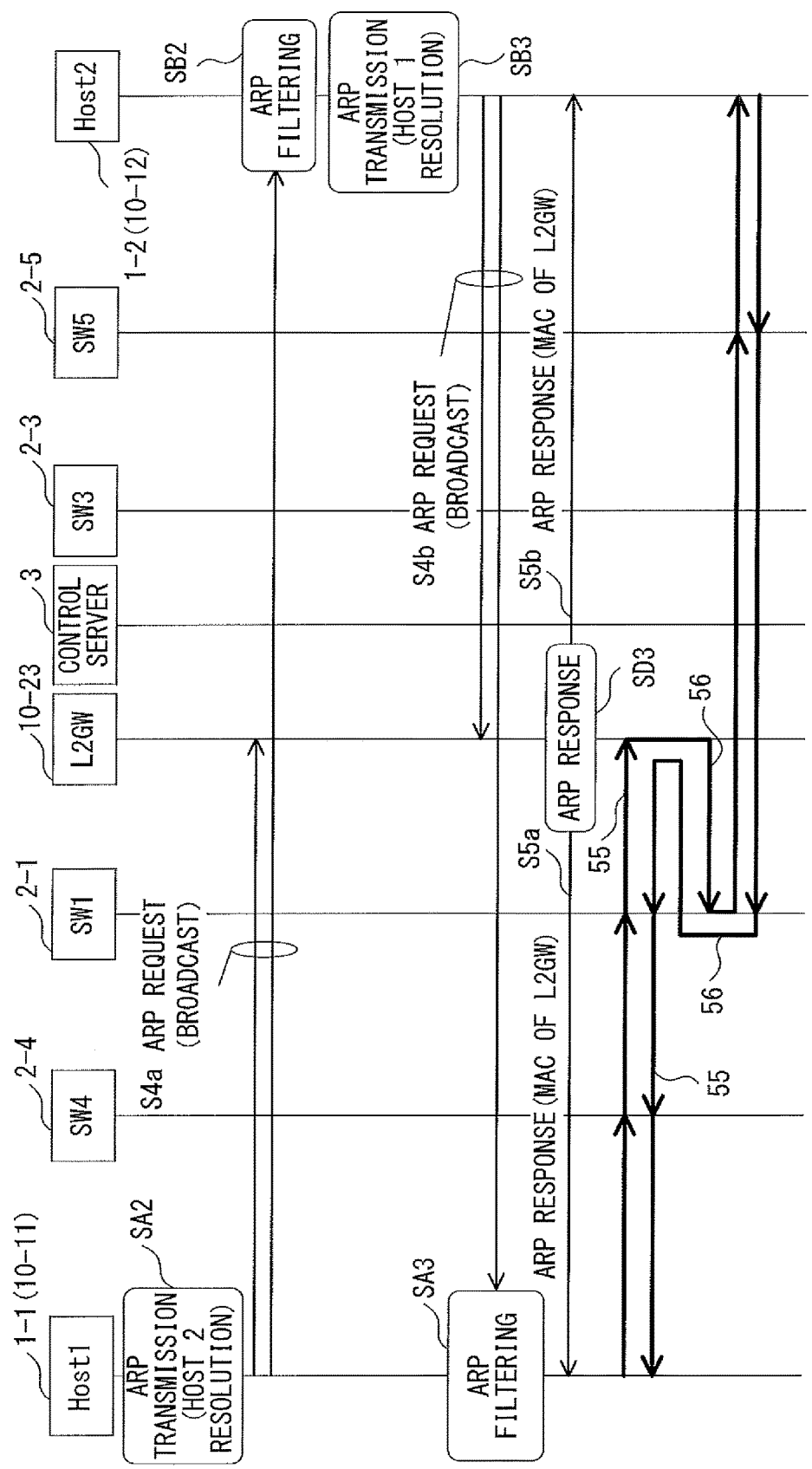

FIG. 11 illustrates operation examples of the control server, the hosts and the switches in a case where transfer routes of packets are switched. FIGS. 12A and 12B are a sequence diagram illustrating operation examples of the control server, the hosts and the switches in a case where transfer routes of packets are switched. Next, by referring to FIG. 11 and FIGS. 12A and 12B, operations of the control server 3, the hosts 1 and the switches 2 will be explained specifically.

FIG. 11 and FIGS. 12A and 12B illustrate an example of a case where the switching of transfer routes as illustrated in FIG. 2 is conducted. Accordingly, FIGS. 12A and 12B illustrate the hosts 1-1 and 1-2 as the hosts 1 in which the switching of transfer routes is conducted. These hosts 1-1 and 1-2 are the VMa 10-11 and the VMb 10-12 in reality. "L2GW 10-23" appearing in FIGS. 12A and 12B represents an assumption that the host 1-3 has been selected as the relay host 1. As the switches 2, only the four switches 2-1 and 2-3 through 2-5, which exist in the transfer route 51 before the switching or in the transfer route 55 or the transfer route 56 after the switching are illustrated.

Congestion that has occurred in the link between the switches 2-3 and 2-4 is reported to the control server 3 by the switch 2-3 or 2-4. In response to the reception of that report (referred to as a "congestion detection event" hereinafter), the control server 3 performs the filter setting for the VMa 10-11 and the VMb 10-12 in the host 1-1 and the host 1-2 for discarding ARP packets that are to be discarded (SC1). On the basis of this filter setting, filtering setting request messages as illustrated in FIG. 9 are transmitted to the VMa 10-11 and the VMb 10-12 in the host 1-1 and the host 1-2, respectively (S1).

The hosts 1-1 and 1-2 respectively conduct the filter setting for discarding ARP packets transmitted from the hosts 1-2 and 1-1 in response to the reception of a filtering setting request message (SA1, SB1).

After transmitting a filtering setting request message, the control server 3 instructs the L2GW 10-23 in relay host 1-3 to transmit a GARP packet (SC2). This transmission instruction is given by transmitting a GARP transmission request message as illustrated in FIG. 10 to the L2GW 10-23 in the relay host 1-3 (S2).

When the L2GW 10-23 has not been generated in the relay host 1-3, the control server 3 instructs the relay host 1-3 to activate the L2GW 10-23 before transmitting a GARP transmission request message. In FIG. 11 and FIGS. 12A and 12B, it is assumed that the L2GW 10-23 has already been activated in the relay host 1-3 and the operations etc. of activating the L2GW 10-23 are omitted.

In accordance with a received GARP transmission request message, the L2GW 10-23 sequentially performs processes for transmitting the two types of GARP packets having different search target MAC addresses. As such processes, for example the process (SD1) for a GARP packet having the MAC address of the host 1-1 as a search target MAC address is performed first. Next, the process (SD2) for a GARP packet having the MAC address of the host 1-2 as a search target MAC address is performed. As a result of this, broadcast (S3a) of a GARP packet having the MAC address of the host 1-1 as a search target MAC address is performed first. Next, broadcast (S3b) of a GARP packet having the MAC address of the host 1-2 as a search target MAC address is performed.

By broadcasting the two types of GARP packets having different search target MAC addresses, entries storing the search target MAC addresses are deleted from the respective ARP tables 100 of the hosts 1-1 and 1-2. Also, each switch 2 deletes corresponding entries from the forwarding table 2a.

By deleting such entries, the host 1-1 or 1-2 transmits an ARP packet on an as-needed basis. Accordingly, for example the host 1-1 performs a process for transmitting an ARP packet that has stored the IP address of the host 1-2 (SA2). As a result of this, an ARP packet is broadcast from the host 1-1 (S4a).

In the host 1-2, filter setting has been conducted for discarding ARP packets transmitted from the host 1-1. Accordingly, even when receiving ARP packets transmitted from the host 1-1, the host 1-2 discards the received ARP packets (SB2).

In the host 1-2, filter setting has been conducted for discarding ARP packets transmitted from the host 1-1. Accordingly, even when receiving ARP packets transmitted from the host 1-1, the host 1-2 discards the received ARP packets (SB3).

The host 1-2 also performs a process for transmitting an ARP packet that has stored the IP address of the host 1-1 (SB3) on an as-needed basis. As a result of this, ARP packets are broadcast from the host 1-2 (S4b). However, in the host 1-1, filter setting has been performed for discarding ARP packets transmitted from the host 1-2. Accordingly, even when receiving ARP packets transmitted from the host 1-2, the host 1-1 discards received ARP packets (SA3).

The L2GW 10-23 performs a process for responding to ARP packets respectively transmitted from the hosts 1-1 and 1-2 (SD3). Thereby, ARP response packets storing the MAC address assigned to the L2GW 10-23 are transmitted to the hosts 1-1 and 1-2, respectively (S5a, S5b).

As a result of this, the host 1-1 adds to the ARP table 100 an entry for communicating with the host 1-2. The MAC address stored in that entry is a MAC address assigned to the L2GW 10-23. Similarly, the host 1-2 also adds an entry storing the MAC address of the L2GW 10-23 to the ARP table 100. Accordingly, packet transfer between the VMa 10-11 in the host 1-1 and the VMb 10-12 in the host 1-2 is conducted in the order of the transfer route 55 and the transfer route 56 or the transfer route 56 and the transfer route 55.

Hereinafter, by referring to the flowcharts illustrated in FIG. 13 through FIG. 16, more detailed explanations will be given for operations of the control server 3, the VMn 10-1 in the host 1 and the L2GW 10-2 in the relay host 1.

Figure 13:
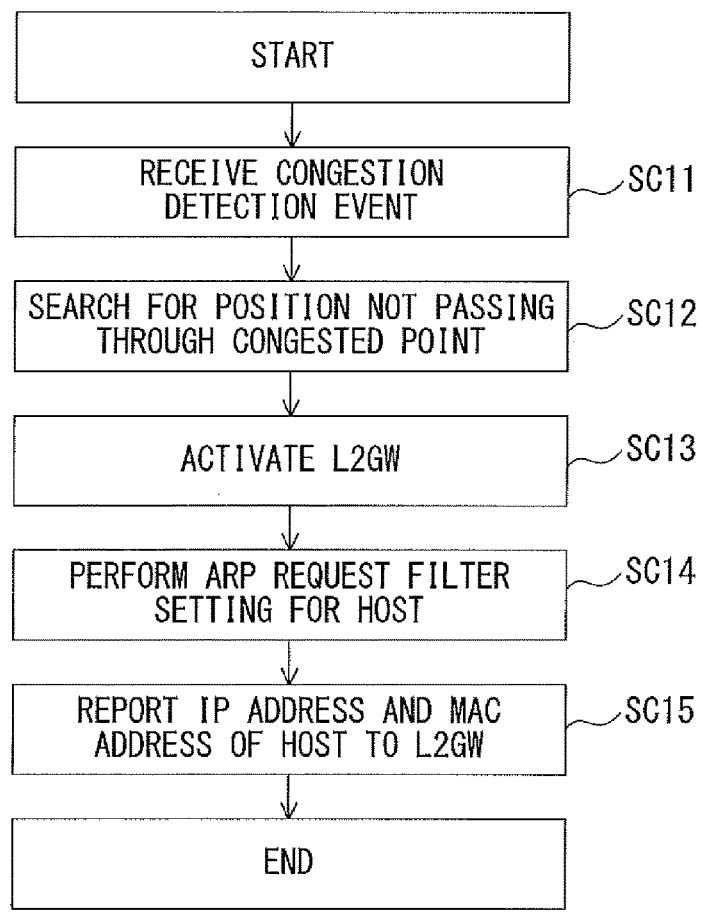
FIG. 13 is a flowchart of a transfer route switching process executed by the control server.

FIG. 13 is a flowchart of a transfer route switching process executed by the control server 3. This transfer route switching process is implemented by the CPU 31 executing the control program 3c, and is triggered by reception of a congestion detection event in which detection of congestion is reported by one of the switches 2. Setting of a transfer route that bypasses a congested point (congested link) is implemented by the execution of this transfer route switching process.

Usually, there are a plurality of pairs of hosts 1 for which packet transfer is performed via a congested point. However, only two hosts 1 (VMn 10-1) for which packet transfer is performed via a congested point are assumed for convenience in this example, and the flowcharts are also based on that assumption. First, FIG. 13 is referred to so as to explain operations of the control server 3 in detail.

First, the CPU 31 performs a process for receiving a congestion detection event transmitted from the switch 2 (SC11). Next, the CPU 31 extracts candidates for the relay host 1 from the congested point specified by the received congestion detection event, and selects as the relay host 1 the candidate having the lowest CPU usage rate from among the extracted candidates (SC12). As described above, the selection of this relay host 1 is made by referring to the route table 3a (FIG. 7) and the VM operation host table 3b (FIG. 8) for each VM flow.

Next, the CPU 31 activates the L2GW 10-2 (SC13) when the L2GW 10-2 has not been activated in the selected relay host 1. Thereafter, the CPU 31 conducts filter setting (SC14) for causing the respective VMns 10-1 that are operating in the two hosts 1 to which packets are transferred via a congested point to discard ARP packets that are to be discarded (SC14). This filter setting is a process executed as SC1 in FIG. 12A, and filtering setting request messages as illustrated in FIG. 9 are transmitted to the respective target VMns 10-1.

Next, the CPU 31 transmits a GARP transmission request message as illustrated in FIG. 10 to the L2GW 10-2 in the selected relay host 1 (SC15). The process of transmitting this GARP transmission request message is executed as SC2 in FIG. 12A. The transmission of this GARP transmission request message terminates a series of processes for switching transfer routes for one pair of the VMns 10-1. When there is no more pair of VMns 10-1 that needs the switching of transfer routes, the transfer route switching process is terminated.

Figure 14:
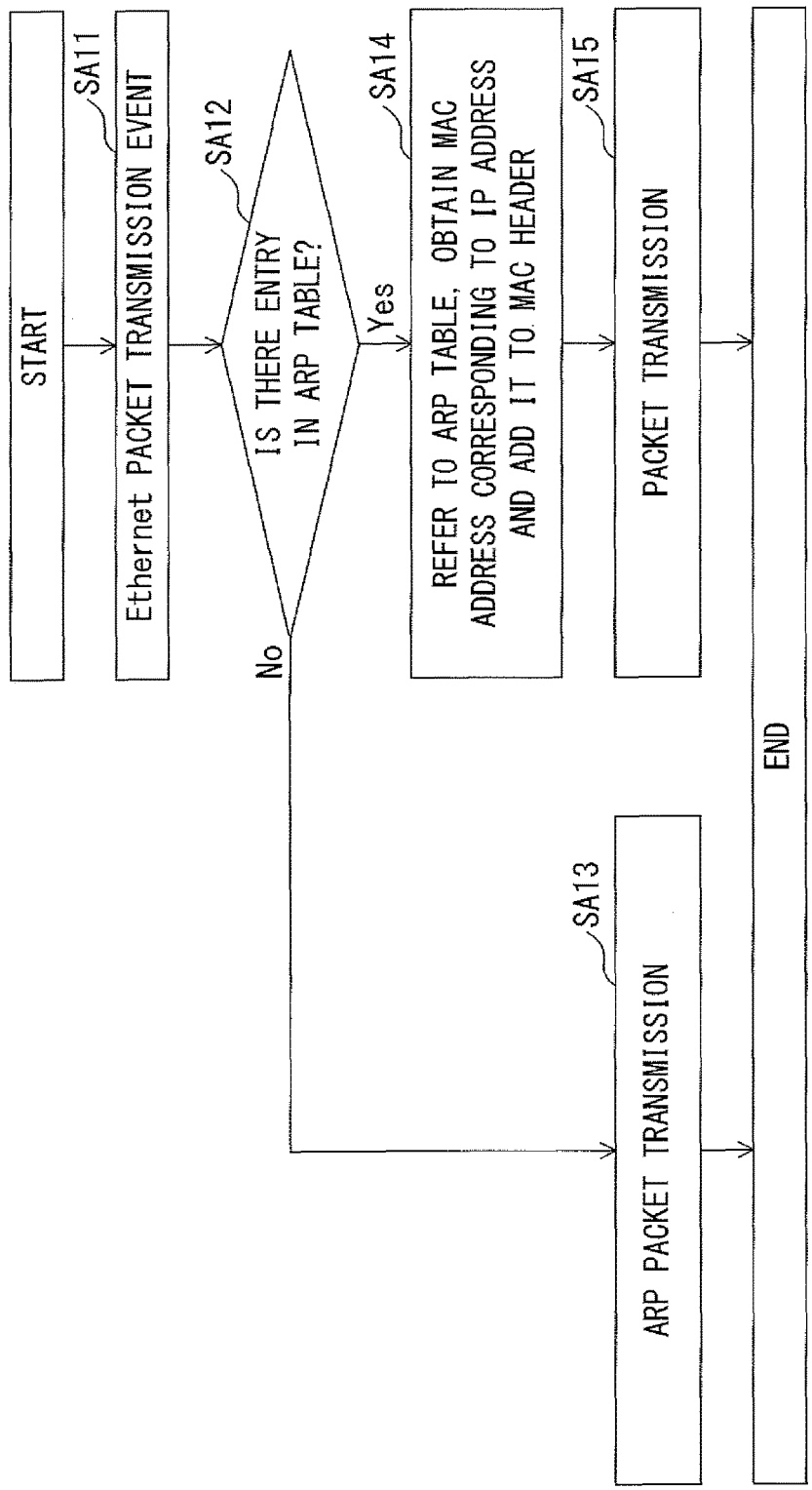
FIG. 14 is a flowchart of a packet transmission process executed by a host.

FIG. 14 is a flowchart of a packet transmission process executed by a host. This packet transmission process is implemented by a CPU 11 executing the OS 110, and is executed when it has become a situation in which a packet (described as "Ether packet" in FIG. 14) is to be transmitted. Next, detailed explanations will be given for a packet transmission process by referring to FIG. 14.

First, the CPU 11 receives a transmission request (event) of a packet from for example an application (SA11). That transmission request includes an IP address specified as the transmission destination of the packet. Receiving a transmission request from an application or the like, the CPU 11 refers to the ARP table 100 and determines whether or not there is an entry that includes the specified IP address (SA12). When there is an entry storing the specified IP address in the ARP table 100, the determination result of SA12 is Yes, and the process proceeds to SA14. When there is not an entry storing the specified IP address in the ARP table 100, the determination result in SA12 is No, and the process proceeds to SA13.

When it is not possible to identify a MAC address that corresponds to a specified IP address, it is not possible to generate a packet that is to be transmitted (tunneling packet). Accordingly, in SA13, the CPU 11 generates and transmits an ARP packet for confirming an MAC address that corresponds to a specified IP address. Thereafter, the packet transmission process is terminated without transmitting a requested packet (tunneling packet). SA13 is a process that is implemented as SA2 and SB3 in FIG. 12B.

In SA14, the CPU 11 refers to an entry storing the specified IP address, obtains a MAC address corresponding to that IP address, and generates a requested packet (tunneling packet). Next, the CPU 11 transmits the generated tunneling packet via the NIC 15 identified on the basis of the ARP table 100 (SA15). Thereafter, this packet transmission process is terminated.

Even when the switching of transfer routes as illustrated in FIG. 2 has been conducted, each host refers to the ARP table 100, and generates and transmits a tunneling packet. Accordingly, the same method of generating a tunneling packet is used in each host regardless of whether or not the switching of transfer routes has been conducted.

Figure 15:
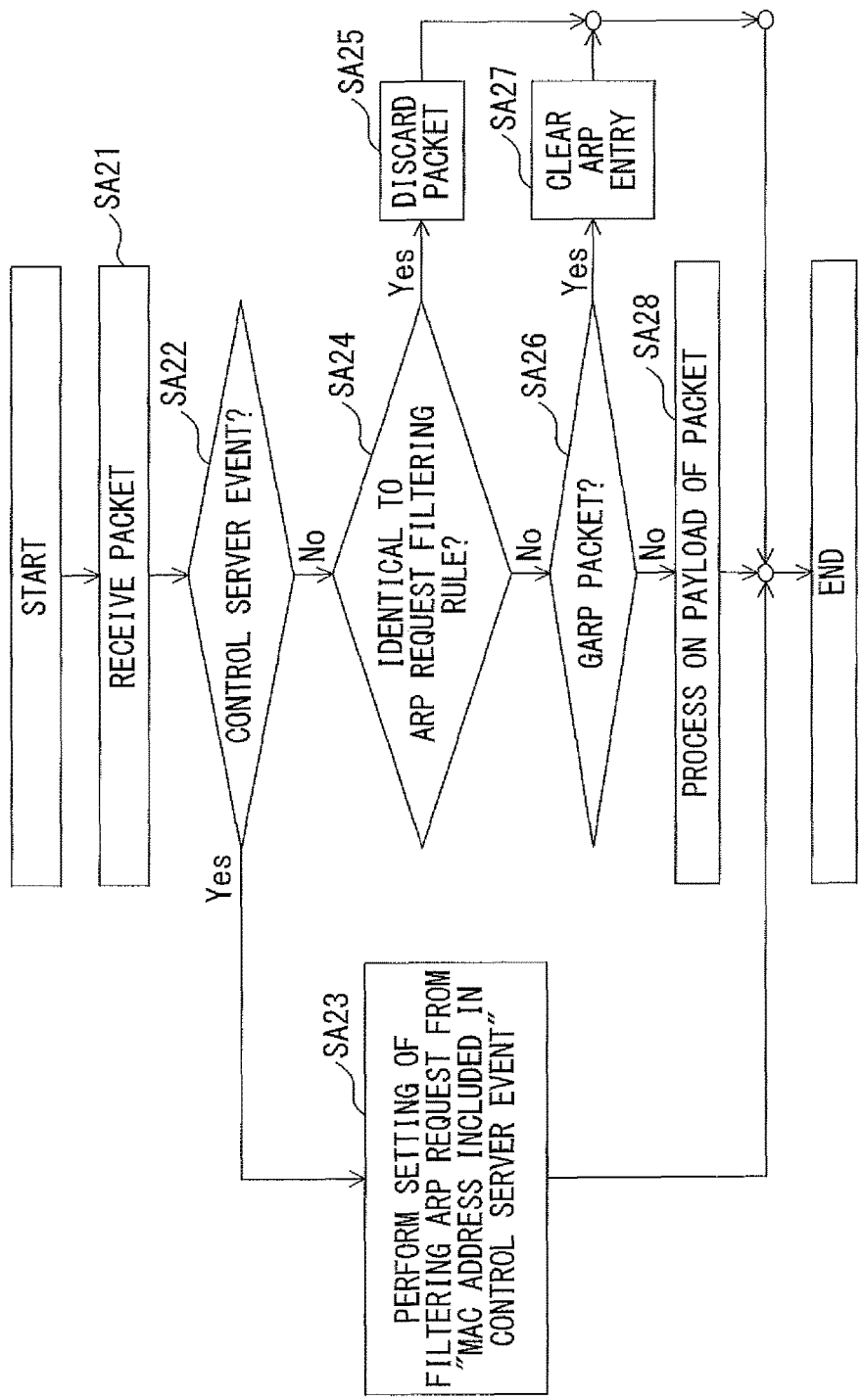
FIG. 15 is a flowchart of a packet reception process executed by a host.

FIG. 15 is a flowchart of a packet reception process executed by a host. This packet reception process is also implemented by the CPU 11 executing the host OS 110, and is triggered by reception of a packet. Next, by referring to FIG. 15, detailed explanations will be given for a packet reception process.

To each host 1, a packet related to switching of transfer routes (message, which will be referred to as a "control server event" hereinafter) is transmitted from the control server 3. In this example, only a filtering setting request message as illustrated in FIG. 9 is assumed as the control server event for convenience.

First, the CPU 11 performs a process for receiving a packet (SA21). Next, the CPU 11 determines whether or not a received packet is a control server event (SA22). When a filtering setting request message as illustrated in FIG. 9 has been received, the determination result in SA22 is Yes, and the process proceeds to SA23. When a filtering setting request message has not been received, the determination result in SA22 is No, and the process proceeds to SA24. SA23 corresponds to the process executed as part of SA3 and SB2 illustrated in FIG. 12B.

In SA23, the CPU 11 performs setting of filtering (discarding) ARP packets (described as "ARP request" in FIG. 15) having MAC addresses included in control server events (filtering setting request messages) as the transmission source MAC addresses. Thereafter, this packet reception process is terminated.

In SA24, the CPU 11 determines whether or not a received packet is an ARP packet and the transmission source MAC address of that ARP packet is identical to the MAC address set for filtering. When an ARP packet having the MAC address set for filtering as the transmission source MAC address has been received, the determination result in SA24 is Yes, and the process proceeds to SA25. When a received packet is not an ARP packet or when an ARP packet having a transmission source MAC address that is not a MAC address set for filtering has been received, the determination result in SA24 is No, and the process proceeds to SA26.

In SA25, the CPU 11 discards a received ARP packet. Thereafter, this packet reception process is terminated. The discarding of ARP packets makes it possible to conduct setting of transfer routes in such a manner that packets can be transferred via the L2GW 10-2 more securely.

In SA26, the CPU 11 determines whether or not a received packet is a GARP packet. When a GARP packet has been received, the determination result in SA26 is Yes, and the process proceeds to SA27. When a GARP packet has not been received, the determination result in SA26 is No, and the process proceeds to SA28. When a GARP packet has been received, the determination result in SA26 is Yes, and the process proceeds to SA27.

In SA27, the CPU 11 deletes, from the ARP table 100, an entry including the same MAC address as the search target MAC address stored in a GARP packet. Thereafter, this packet reception process is terminated.

In SA28, the CPU 11 performs a process on a payload included in a received packet, i.e., a process on an IP packet, an ARP packet, etc. This process includes a process of for example giving a packet to an appropriate application. After the execution of such a process in SA28, this packet reception process is terminated.

Figure 16:
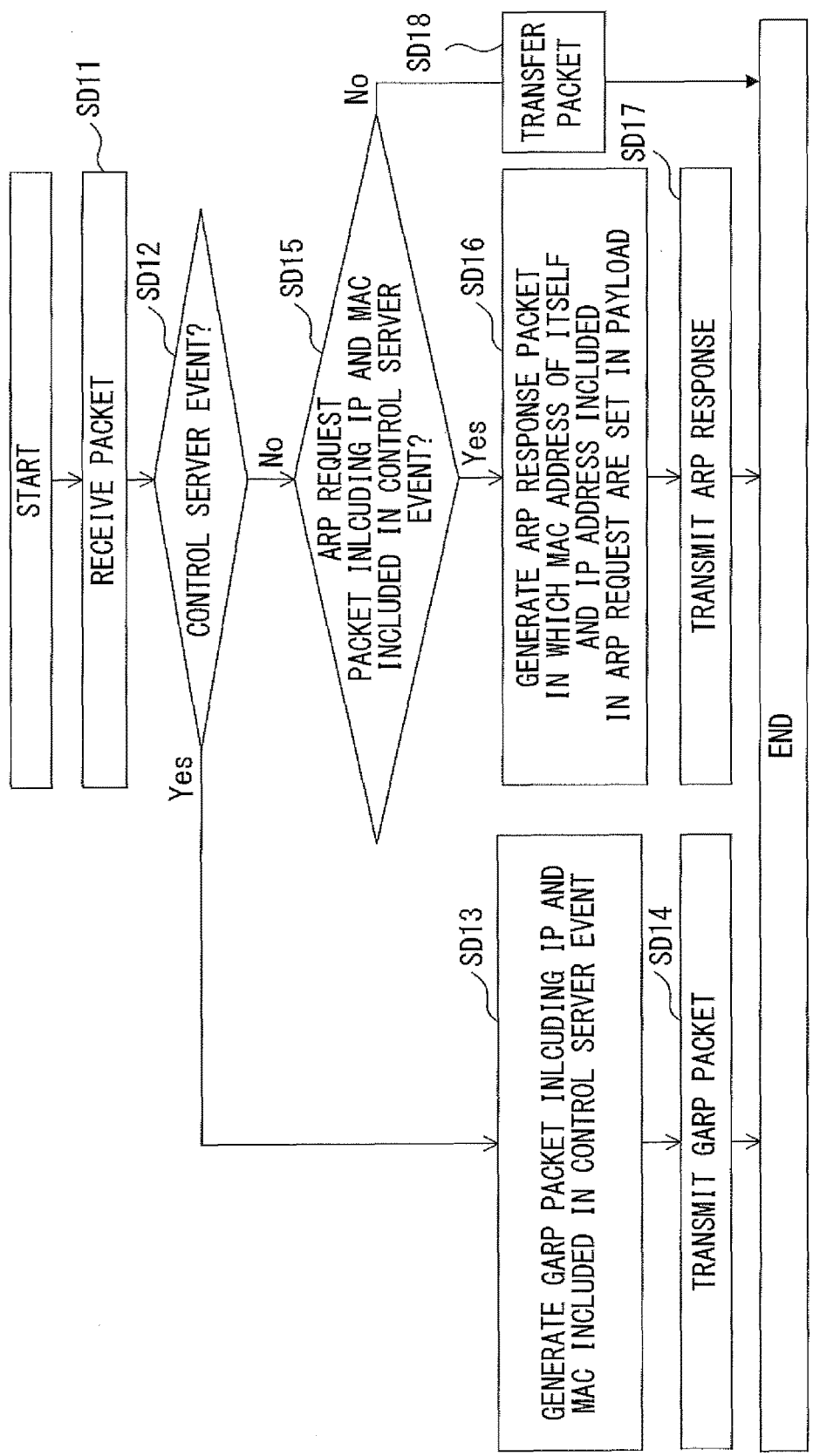
FIG. 16 is a flowchart of a packet reception process executed by a relay host.

FIG. 16 is a flowchart of a packet reception process executed by a relay host. This packet reception process is implemented by the CPU 11 executing the transfer application 105, and is triggered by reception of a packet. FIG. 16 is referred to for final explanations in detail to be given for operations of the L2GW 10-2 as operations of the relay host 1.

To each host 1, a packet related to switching of transfer routes (control server event) is transmitted from the control server 3 on an as-needed basis. In this example, a GARP transmission request message as illustrated in FIG. 10 is only assumed as a control server event for convenience. The activation (generation) itself of the L2GW 10-2 including the assignment of a virtual MAC address is executed by the hypervisor that is executed in the host 1.

First, the CPU 11 performs a process for receiving a packet (SD11). Next, the CPU 11 determines whether or not a received packet is a control server event (SD22). When a GARP transmission request message as illustrated in FIG. 10 has been received, the determination result in SD12 is Yes, and the process proceeds to SD13. When a GARP transmission request message has not been received, the determination result in SD12 is No, and the process proceeds SD14.

In SD13, the CPU 11 generates two GARP packets respectively having, as the search target IP addresses and the search target MAC addresses, the IP addresses and the MAC addresses included in a control server event (GARP transmission request message). Thereafter, the CPU 11 transmits the generated two GARP packets (SD14). After transmitting the GARP packets, the packet reception process is terminated. SD1 and SD2 in FIG. 12A are implemented by this SD13.

In SD15, the CPU 11 determines whether or not a received packet is an ARP packet including an IP address and a MAC address included in a control server event (GARP transmission request message). That ARP packet is an ARP packet transmitted from the host 1 having the IP address and the MAC address included in the control server event (GARP transmission request message). When such an ARP packet has been received, the determination result in SD15 is Yes, and the process proceeds to SD16. When such an ARP packet has not been received, i.e., when a packet that is a transfer target has been received, the determination result in SD15 is No, and the process proceeds to SD18.

In SD16, the CPU 11 generates an ARP response packet in which the MAC address of the L2GW 10-2 of the CPU 11 is set as the search target MAC address in the ARP payload. Thereafter, the CPU 11 transmits the generated ARP response packet (SD17). After transmitting the ARP response packet, this packet reception process is terminated. SD3 in FIG. 12B is implemented by this SD13.

In SD18, the CPU 11 rewrites the transmission source MAC address and the transmission destination MAC address included in a received packet, and transmits the packet with the rewritten MAC addresses. The transmission source MAC address is rewritten to the MAC address of the L2GW 10-2 of the CPU 11 together with the tunneling protocol information 40 and a general packet to which the tunneling protocol information 40 has been added. The transmission destination MAC address is rewritten to a MAC address that is different from the transmission source MAC address among the two MAC addresses included in a control server event (GARP transmission request message). A packet with the rewritten MAC address is transmitted from the NIC 15 that is different from the NIC 15 used for the reception. After performing the transfer of a packet, this packet reception process is terminated.

Note that while the present embodiment makes the relay host 1 relay packets transmitted respectively from the VMns 10-1 in the two hosts 1 in response to the occurrence of a congested point as illustrated in FIG. 2, it is also possible to make the relay host 1 transfer a packet only in one direction. This is because even when for example a packet transmitted from the VMa 10-11 in the host 1-1 is only relayed by the relay host 1-3, the reduction in the traffic amount can be expected in the link connecting the switches 2-3 and 2-4. Because of this as well, selection of targets of switching of transfer routes may be conducted in accordance with reasons for switching those transfer routes (congestion, failure, etc.) or in accordance with purposes (reduced amount needed for the communication traffic) etc.

The number of links that are to be bypassed for transfer is not limited to one. Selection of the relay host 1 may be conducted by assuming a plurality of links through which packets are transferred continuously or a plurality of links through which packets are not transferred directly.

Also, the relay host 1 is selected from among candidate hosts 1 by focusing on the CPU usage rates according to the present embodiment, however, the selection may be conducted in accordance with a different rule. For example, it is also possible to priorly select, as the relay host 1, the host 1 in which the L2GW 10-2 has already been generated from among the candidate hosts 1. When the host 1 in which the L2GW 10-2 is operating is selected priorly as the relay host 1, it is possible to promptly start packet transfer that bypasses a congested point.

Also, in the present embodiment, the control server 3 is provided independently from the hosts 1, however, it is also possible to include the control server 3 in one of the hosts 1. In a large-scale information processing system, it is also possible to prepare a plurality of the control servers 3 and assign the control server 3 to each target area (e.g., a VLAN).

In addition to the above, various modifications are possible. As an example, although a CPU has been used for the above explanations, the present embodiment is not limited to this and a processor such as a Micro Processing Unit (MPU) may be used instead of a CPU.

As described above, according to some embodiments, it is possible to use a tunnel ID, which is resources of lower limitation than that of VLAN-IDs, in order to suppress packet transfer that uses a link for which packet transfer is to be suppressed, without directly controlling a network device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a first information processing device that is a transmission destination of a packet;
a second information processing device that includes a first port and a second port and that is configured to relay the packet between the first port and the second port;
a third information processing device that is a transmission source of the packet; and
a control device that is configured to control the first information processing device, the second information processing device and the third information processing device, wherein
the control device transmits to the first information processing device that is the transmission destination of the packet a first filter setting report for setting the first information processing device such that the first information processing device does not respond when a first request packet for resolving an address including first identification information that identifies the first information processing device is received,
the control device controls the second information processing device such that the second information processing device transmits a first confirmation packet including the first identification information via the first port,
upon receipt of the first confirmation packet, the third information processing device that is the transmission source of the packet deletes a first entry that includes the first identification information from an address table, and transmits the first request packet that includes the first identification information, upon receipt of the first request packet, the second information processing device transmits a first response packet to the third information processing device via the first port, the first response packet including second identification information that identifies the second information processing device, and upon receipt of the first response packet, the third information processing device registers in the address table a second entry including the second identification information included in the first response packet.

2. The information processing system according to claim 1, wherein the control device transmits to the third information processing device a second filter setting report for setting the third information processing device such that the third information processing device does not respond when a second request packet for resolving an address including second identification information that identifies the third information processing device is received, and the control device controls the second information processing device such that the second information processing device transmits a second confirmation packet including the second identification information via the second port, upon receipt of the second confirmation packet, the first information processing device deletes a third entry that includes the second identification information from another address table, and transmits the second request packet that includes the second identification information, upon receipt of the second request packet, the second information processing device transmits a second response packet to the first information processing device via the second port, the second response packet including the second identification information that identifies the second information processing device, and upon receipt of the second response packet, the first information processing device registers in the other address table a fourth entry including the second identification information included in the second response packet.

3. The information processing system according to claim 1, wherein the information processing system includes at least three of a plurality of information processing devices, and the control device is further configured to select, as the second information processing device, an information processing device existing in a route that is able to avoid congestion from among the plurality of information processing devices when the congestion occurred in a network.

4. The information processing system according to claim 3, wherein the control device is further configured to select the second information processing device on the basis of a usage rate of an arithmetic processing unit included in each selectable information processing device when there are a plurality of information processing devices that are selectable as the second information processing device from among the plurality of information processing devices.

5. A control device in an information processing system having first, second and third information processing devices, the control device comprising:

a processor configured to execute a process including, transmitting to the first information processing device a filter setting report for setting the first information processing device so that the first information processing device does not make a response when a first request packet for resolving an address including first identification information that identifies the first information processing device that is a transmission destination of a packet is received, controlling the second information processing device that includes a first port and a second port and that relays the packet between the first port and the second port such that the second information processing device transmits a first confirmation packet including the first identification information via the first port, controlling the third information processing device that is a transmission source of the packet such that the third information processing device, upon receipt of the first confirmation packet, deletes an entry that includes the first identification information from an address table, and transmits the first request packet that includes the first identification information, controlling the second information processing device, upon receipt of the first request packet, such that the second information processing device transmits a first response packet to the third information processing device via the first port, the first response packet including second identification information that identifies the second information processing device, and controlling the third information processing device, upon receipt of the first response packet, such that the third information processing device registers in the address table an entry including the second identification information included in the first response packet.

6. A controlling method for an information processing system, the controlling method comprising:

transmitting, by a control device to a first information processing device, a filter setting report for setting the first information processing device so that the first information processing device does not make a response when a first request packet for resolving an address including first identification information that identifies the first information processing device that is a transmission destination of a packet is received;

controlling, by the control device, a second information processing device that includes a first port and a second port and that relays the packet between the first port and the second port, such that the second information processing device transmits a first confirmation packet including the first identification information via the first port;

controlling, by the control device, a third information processing device that is a transmission source of the packet such that the third information processing device, upon receipt of the first confirmation packet, deletes an entry that includes the first identification information from an address table, and transmits the first request packet that includes the first identification information;

controlling, by the control device, the second information processing device, upon receipt of the first request packet, such that the second information processing device transmits a first response packet to the third information processing device via the first port, the first response packet including second identification information that identifies the second information processing device, and controlling, by the control device, the third information processing device, upon receipt of the first response packet, such that the third information processing device registers in the address table an entry including the second identification information included in the first response packet.

7. A non-transitory computer-readable recording medium having stored therein a control program for causing a control device to execute a control process comprising:

transmitting to a first information processing device, a filter setting report for setting the first information processing device so that the first information processing device does not make a response when a first request packet for resolving an address including first identification information that identifies the first information processing device that is a transmission destination of a packet is not received;

controlling a second information processing device that includes a first port and a second port and that relays the packet between the first port and the second port, such that the second information processing device transmits a first confirmation packet including the first identification information via the first port;

controlling a third information processing device that is a transmission source of the packet such that the third information processing device, upon receipt of the first confirmation packet, deletes an entry that includes the first identification information from an address table, and transmits the first request packet that includes the first identification information;

controlling the second information processing device, upon receipt of the first request packet, such that the second information processing device transmits a first response packet to the third information processing device via the first port, the first response packet including second identification information that identifies the second information processing device, and controlling the third information processing device, upon receipt of the first response packet, such that the third information processing device registers in the address table an entry including the second identification information included in the first response packet.

* * * * *